United States Patent Office 2,833,799
Patented May 6, 1958

2,833,799

RECOVERY OF TETRAVALENT CATIONS FROM AQUEOUS SOLUTIONS

Robert L. Moore, Richland, Wash., assignor to the United States of America as represented by the United States Atomic Energy Commission No Drawing. Application March 3, 1954
Serial No. 413,971

12 Claims. (Cl. 260—429.1)

This invention deals with the recovery of tetravalent cations from aqueous solutions and also with the separation of tetravalent cations from cations which have a valence other than four. The invention is particularly concerned with the recovery of plutonium, zirconium and/or tetravalent cerium values from aqueous solutions by precipitation.

In chemical processing, solutions which contain the tetravalent values defined above are encountered frequently. For instance, there are many ore solutions which contain zirconium values. Zirconium is a widely used element nowadays, in particular for use in alloys because it provides high corrosion resistance. Tetravalent cerium has also a great many applications; for instance, it is used in special steels. Plutonium is a valuable ingredient of fuel elements of neutronic reactors; it is usually recovered from the so-called dissolver solutions, which are the aqueous solutions obtained by dissolving thermal-neutron-irradiated uranium in nitric acid. When processing dissolver solutions, it often becomes important to remove the tetravalent cerium and zirconium values from uranium-containing solutions because these two tetravalent ions remain associated to a high degree with the uranium in most cases, for instance in separation processes which are based on the extraction with a water-immiscible solvent.

It is an object of this invention to provide a process for the separation of tetravalent cations from aqueous solutions by precipitation whereby a high yield is obtained.

It is another object of this invention to provide a process for the separation of tetravalent cations from aqueous solutions by precipitation which is excellently qualified for the treatment of solutions that contain the values to be recovered in tracer or micro-concentrations on account of the very low solubility of the precipitate formed.

It has been found that monoalkyl phosphates precipitate tetravalent plutonium, zirconium and/or cerium values from aqueous mineral acid solutions almost quantitatively. The invention thus comprises adding a monoalkyl phosphate to a mineral acid aqueous solution containing the values to be recovered, whereby a precipitate forms with the tetravalent values, and separating the precipitate from the solution.

All alkyl phosphates, if water-soluble, are suitable for the process of this invention. However, monobutyl phosphate has been found best. Likewise, while all strong mineral acids are satisfactory for acidification of the aqueous solution to be treated, nitric acid yielded the best results.

Experiments were made to determine the effect of varying periods of time for digestion of the mixture, prior to separation of the precipitate, on the quantitativeness of the precipitation. For this purpose a solution containing 30 mg. of $Pu(NO_3)_4$ per liter and 3 M in nitric acid was prepared, and monobutyl phosphate (MBP) was added thereto in a quantity to obtain a concentration of 1% by volume. The solution became turbid immediately upon mixing, which was carried out in a thermostat at 25° C. Samples of the mixture were removed after varying total stirring times and centrifuged; the supernatant solutions were analyzed for their plutonium content. The results are given in Table I.

*Table I*

| Time of stirring (min.): | Pu, mg./l. |
|---|---|
| 15 | 0.39 |
| 30 | 0.49 |
| 130 | 0.44 |
| 220 | 0.47 |

These results show that a digestion time of 30 minutes is sufficient to obtain a constant plutonium concentration in the supernatant and thus maximum precipitation. When the supernatant solutions were analyzed again several days after precipitation the results had not changed during this time. Over 98% of the plutonium content of the solution had been precipitated in the above instances.

In another set of experiments the function of solubility of the plutonium precipitate and nitric acid concentration was studied. The solution used for this purpose contained 30 mg. of $Pu(NO_3)_4$ per liter and nitric acid in varying concentrations. Monobutyl phosphate was again added in a quantity to correspond to a concentration of 1% by volume. The temperature was room temperature (25° C.) and stirring was carried out for 30 minutes prior to separation of the supernatant for the purpose of analysis. The plutonium concentrations remaining in the supernatant after the precipitation at the various nitric acid concentrations are shown in Table II.

*Table II*

| M $HNO_3$: | Pu (mg./l.) |
|---|---|
| 0.6 | 0.306 |
| 1.6 | 0.333 |
| 3.0 | 0.45 |
| 5.0 | 0.664 |
| 10 | 3.93 |
| 15 | 43.2 |

It is obvious from these data that the solubility of the plutonium compound formed with the monobutyl phosphate increases with increasing acidity and that for purposes of quantitative recovery the nitric acid concentration should not be higher than 5 M.

Another study was made to determine the relationship between solubility of the plutonium-monobutyl phosphate compound and concentration of monobutyl phosphate. Solutions 3 M in nitric acid and containing 20 mg. of $Pu(NO_3)_4$ per liter were mixed each with monobutyl phosphate at 25° C. and the mixture stirred for 30 minutes. In these experiments the quantities added of monobutyl phosphate were varied. The plutonium concentrations of the supernatant of each test are given in Table III.

*Table III*

| MBP | | Solubility of Pu Compound | |
|---|---|---|---|
| Volume, percent | M | mg./l. | M×10⁶ |
| 0.01 | 0.0006 | >20 | |
| 0.05 | 0.0031 | >20 | |
| 0.1 | 0.0062 | 13.2 | 54 |
| 0.3 | 0.0187 | 1.47 | 6.2 |
| 0.5 | 0.031 | 0.72 | 3.0 |
| 1 | 0.062 | 0.45 | 1.88 |
| 1.2 | 0.075 | 0.34 | 1.42 |
| 2 | 0.124 | 0.42 | |
| | | 0.502 | 1.84 |
| | | 0.414 | |
| 3.7 | 0.230 | 0.41 | 1.72 |
| 5 | 0.311 | 0.59 | 2.47 |
| 10 | 0.622 | 1.21 | 5.1 |
| 20 | 1.24 | 22.2 | 93 |

The table, and better yet a curve drawn from these values given therein, show that at a concentration between 0.5 and 5 volume percent of monobutyl phosphate the solubility of the plutonium compound is lowest, that the range between 1 and 4 volume percent is better, and that the concentration of about 2 volume-percent is best for plutonium precipitation. On either side of the range of between 0.5 and 5% the solubility increases steadily The effect of temperature changes on the solubility was also studied, and it was found that an increase of temperature slightly increases the solubility of the compound formed. In one instance, for example, a solution containing 40 mg. of $Pu(NO_3)_4$ per liter and being 3 M in nitric acid, after addition of monobutyl phosphate according to a concentration in the solution of 2 volume percent, gave a solubility value of 0.414 mg. per liter at 25° C., while the same mixture under otherwise the same conditions, but at 55° C., showed a solubility of 0.512 mg. per liter.

The precipitate formed from $Pu(NO_3)_4$ and monobutyl phosphate was analyzed and the results indicate that its composition corresponds most likely to the formula $Pu(C_4H_9PO_4)_2 \cdot xH_2O$.

Some experiments were made to see whether precipitates were also obtained with monobutyl phosphate and a number of nontetravalent cations frequently encountered in the types of acid solutions to be treated by the process of this invention. All of the solutions tested were 3 M in nitric acid and monobutyl phosphate was always added thereto in a quantity to obtain a concentration of 1% by volume. The other components and concentrations of the various solutions tested were (a) 0.01 M sodium dichromate, (b) 0.01 M sodium dichromate and 0.1 M aluminum nitrate, (c) 1 M aluminum nitrate, (d) 0.5 gram lanthanum nitrate per liter, (e) 0.1 M ferric nitrate, (f) 0.02 M uranyl nitrate hexahydrate, and (g) 1 M uranyl nitrate hexahydrate. None of these solutions formed a precipitate upon addition of monobutyl phosphate. This indicates that tetravalent plutonium values can be efficiently separated by the process of this invention from aluminum, lanthanum, iron (III), uranyl and chromium (VI) values admixed therewith in an acid aqueous solution.

It was also found that precipitation occurred with a solution containing 1 gram of zirconium nitrate per liter and nitric acid in a concentration of 3 M and also with one containing cerium (IV) nitrate. This fact of precipitability of zirconium and cerium values can be utilized for the precipitation of plutonium from solutions containing the latter in tracer concentrations. By adding a zirconium- or cerium-monobutyl phosphate precipitate to such a plutonium tracer solution, or forming it therein, the plutonium is carried by this cerium or zirconium precipitate.

This is illustrated by the following experiment: To 2 ml. of a solution 3 M in nitric acid and containing 200 μg. of zirconium in the form of zirconium nitrate and 2 μg. of $Pu(NO_3)_4$ monobutyl phosphate was added in a quantity so as to obtain a concentration of 1% by volume; the mixture was stirred and digested at room temperature and then centrifuged. The supernatant and the precipitate were analyzed. While the original solution yielded 284,-292 disintegrations per minute, the precipitate had 275,-570 and the supernate only 3618. Thus 96.9% of the plutonium was found in the precipitate at a mass balance of 98.2%.

An experiment was carried out to ascertain whether trivalent plutonium can also be recovered by the process of this invention. For this purpose a solution containing 1 gram of $Pu(NO_3)_4$ per liter and nitric acid in a concentration of 3 M was used. Two equal portions were employed for two parallel runs, but in one run the plutonium was reduced to the trivalent state by adding hydroxylamine to yield a concentration of 0.1 m. In each run monobutyl phosphate was added to the solution at 25° C. in a quantity to yield a concentration of 1¼% by volume. Comparison of the results obtained in the two experiments shows that the compound formed from the nitrate of the trivalent plutonium and the monobutyl phosphate is at least 1600 times as soluble as that obtained from the $Pu(NO_3)_4$.

The solubility of the monobutyl phosphate-plutonium precipitate was also compared with that of Pu (IV) phosphate, the form in which plutonium has been recovered heretofore. While for the plutonium (IV) phosphate a minimum solubility of 2 mg. per liter was obtained at a nitric acid concentration of 0.832 M and of 18 mg. per liter at 2.08 M nitric acid, the minimum solubility in the case of the plutonium (IV) monobutyl phosphate precipitate has been found to be 0.4 mg. per liter at a nitric acid concentration as high as 3 M. This improvement is especially important for substances that are as scarce and valuable as plutonium.

It will be understood that this invention is not to be limited to the details given herein but that it may be modified within the scope of the appended claims.

What is claimed is:

1. A process of converting tetravalent cations selected from the group consisting of plutonium, zirconium and cerium contained in an aqueous mineral acid solution to a more concentrated form comprising adding a water-miscible monoalkyl orthophosphate to said solution whereby a precipitate forms, and separating the precipitate from the solution.

2. The process of claim 1 wherein the alkyl orthophosphate is monobutyl orthophosphate.

3. The process of claim 2 wherein the mineral acid is nitric acid.

4. The process of claim 2 wherein monobutyl orthophosphate is added in a quantity so as to yield a concentration of from 0.5 to 5% by volume.

5. The process of claim 4 wherein the concentration is between 1 and 4% by volume.

6. The process of claim 5 wherein the concentration is about 2% by volume.

7. The process of claim 3 wherein the nitric acid is present in a maximum concentration of 5 M.

8. The process of claim 1 wherein the monoalkyl orthophosphate is added at a temperature of about 25° C. and the mixture is stirred for about 30 minutes prior to separation of the precipitate.

9. A process of separating tetravalent cations selected from the group consisting of zirconium, cerium and plutonium cations from an aqueous solution comprising securing a maximum nitric acid concentration of 5 M in said solution, adding monobutyl orthophosphate to said solution at 25° C. in a quantity to correspond to a content in the mixture of about 2% by volume, stirring the mixture obtained thereby for approximately 30 minutes at 25° C., and separating a precipitate formed from said solution.

10. A process of separating tetravalent cations selected from the group consisting of zirconium, cerium, and plutonium cations from trivalent and hexavalent cations selected from the group consisting of aluminum, lanthanum, ferric and chromium (VI) cations, said cations being contained in an aqueous mineral acid solution, comprising adding monobutyl orthophosphate to said solution whereby the tetravalent values precipitate, and separating the precipitate from the aqueous solution containing said trivalent and hexavalent cations.

11. A process of separating tetravalent metal values selected from the group consisting of plutonium, cerium and zirconium values from uranyl values contained in mixture in an aqueous nitric acid solution comprising adding monobutyl orthophosphate to said solution whereby the plutonium values precipitate while the uranyl values remain in solution, and separating the precipitate from said solution.

12. A process of separating tetravalent plutonium values from aqueous nitric acid solutions containing said plutonium values in tracer concentrations comprising adding zirconium cations to said solution, adding monobutyl orthophosphate to said solution whereby a precipitate of a zirconium-monobutyl orthophosphate compound forms and said plutonium values are carried on said precipitate, and separating said precipitate from the solution.

References Cited in the file of this patent

UNITED STATES PATENTS

| | | |
|---|---|---|
| 2,329,707 | Farrington | Sept. 21, 1943 |
| 2,346,155 | Denison et al. | Apr. 11, 1944 |

OTHER REFERENCES

Guthrie: Annalen der Chemie und Pharmacie, vol. 99, pages 57–64 (1856).

Hahn: Chemical Abstracts, vol. 42, page 6269$d$ (1948).